United States Patent Office 3,529,044
Patented Sept. 15, 1970

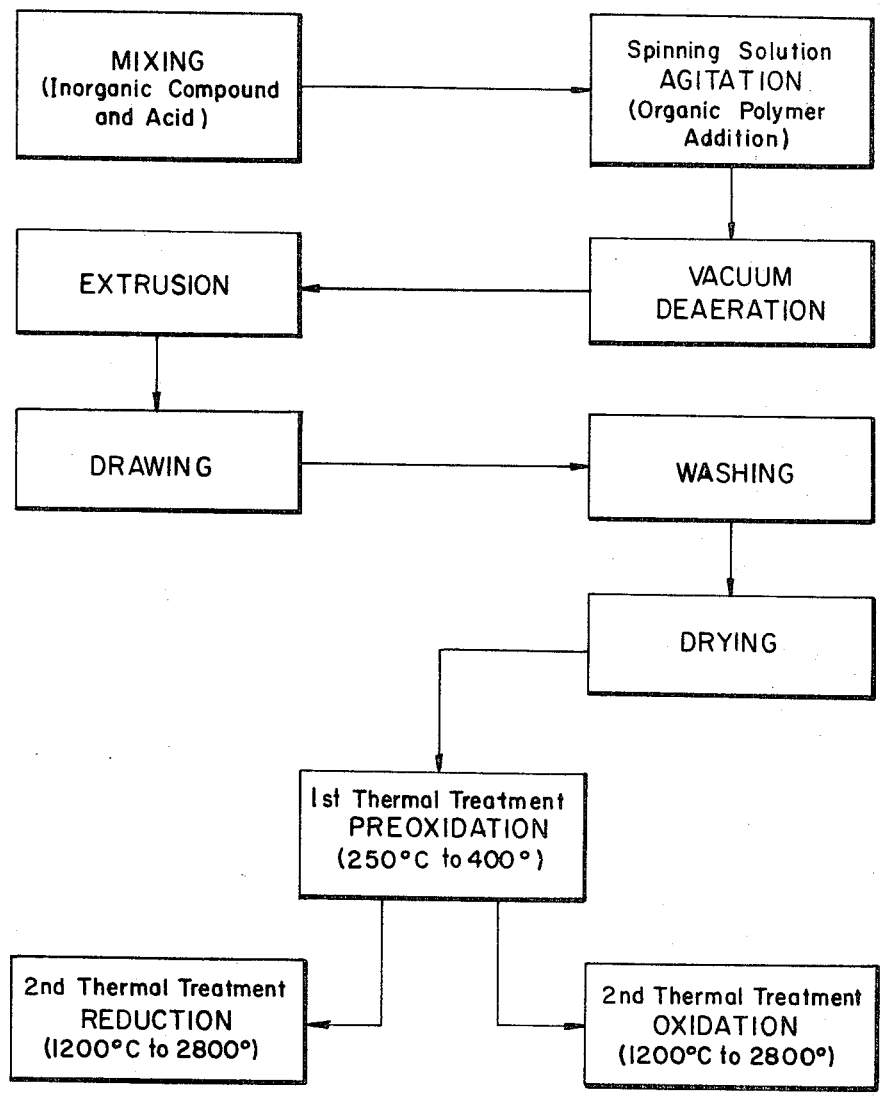

---

3,529,044
PRODUCTION OF INORGANIC FIBROUS MATERIALS
Joseph G. Santangelo, Morristown, N.J., assignor to Celanese Corporation, New York, N.Y., a corporation of Delaware
Filed Feb. 28, 1968, Ser. No. 708,749
Int. Cl. C01b *31/30;* C04b *35/46, 35/56*
U.S. Cl. 264—29                                         4 Claims

---

ABSTRACT OF THE DISCLOSURE

An inorganic compound together with a fiber forming organic polymer is dissolved in a suitable acidic solvent to form a spinning solution, the spinning solution is extruded to form a precursor fiber in which the organic polymer serves as a carrier for the inorganic compound, and the resulting precursor fiber is converted by thermal treatment to an inorganic fibrous material which is derived from the inorganic compound.

---

BACKGROUND OF THE INVENTION

The invention relates to the formation of inorganic fibrous materials. More particularly, the invention concerns a process for the production of inorganic fibrous materials formed from metallic oxides or metallic carbides.

In recent years inorganic fibers and processes for the production of the same have received considerable attention. Such interest may be traced at least in part to the increasing demands of industry for fibers capable of withstanding highly elevated temperatures without deleterious effects. For instance, the growing aerospace industry provides many applications for light and strong heat resistant fibrous materials. Inorganic refractory fibers commonly available today in commercial quantities include graphite, alumina-silica, boron nitride, and silicon carbide.

The formation of inorganic refractory fibers has commonly required elaborate and time consuming procedures since such compounds possess high melting points which make melt spinning either impossible or extremely difficult. Procedures for the thermal formation of fibrous graphite have been proposed in which continuous cellulosic fibers or woven textile articles formed therefrom serve as the starting material. See, for example, U.S. Pats. Nos. 3,107,152 to Ford et al., 3,116,975 to Cross et al., and 3,179,605 to Ohsol. Also, generally infusible synthetic polymeric fibers, such as those formed from acrylonitrile or copolymers thereof, have served as starting materials in processes proposed for the production of fibrous graphite. See, for example, U.S. Pat. No. 3,285,-696 to Tsunoda. Applicant's United States application Ser. No. 691,174, filed Dec. 18, 1967, further discloses the thermal formation of graphite fibers in which thermoplastic polyamide fibers serve as the starting material. U.S. Pats. Nos. 3,270,109 and 3,311,689 to Kelsey, and 3,271,173 to Lockhart et al. disclose processes for the production of inorganic oxide monofilaments in which a precursor fiber composed of certain organo-metallic salts is formed and then heated to convert the same to the desired inorganic filament. Additionally, inorganic fibers such as those formed from boron or boron carbide have been prepared by the vapor deposition of the same upon a substrate, e.g. a fine tungsten wire.

It is an object of the invention to provide an efficient process for forming inorganic fibrous materials.

It is another object of the invention to provide a process for the production of inorganic fibrous materials which are heat resistant, and capable of undergoing extended exposure to elevated temperatures without deleterious effects.

It is a further object of the invention to provide an efficient process for the production of inorganic fibers which are particularly suited to serve as reinforcement means in a composite article.

These and other objects, as well as the scope, nature and utilization of the invention will be apparent from the following detailed description and appended claims.

SUMMARY OF INVENTION

It has now been discovered that a process for the production of inorganic fibrous materials comprises forming an acidic spinning solution containing an organic polymer and an inorganic compound present therein, extruding said spinning solution to form a precursor fiber in which the polymer serves as a carrier for the inorganic compound, preoxidizing the precursor fiber in an oxygen-containing atmosphere to produce an infusible charred product which retains a fibrous configuration and is capable of withstanding burning when subjected to an ordinary match flame, and sintering the charred product at a temperature of about 1200° to 2800° C. to produce an inorganic fibrous material derived from the inorganic compound.

DESCRIPTION OF PREFERRED EMBODIMENTS

The spinning solution utilized according to the present invention in the formation of the precursor fiber contains an inorganic compound as well as a fiber forming polymer dissolved therein. Preferably the spinning solution is an acidic spinning dope. Such solutions may be formed by dissolving about 3 to about 7.5 percent by weight of an acid-soluble inorganic compound, and about 9 to 12.5 percent by weight of an acid-soluble polymer in a suitable acid. Sulfuric acid is preferred; however, other acids such as nitric acid may likewise be employed. The spinning solution may be formed by dissolving the inorganic compound in the acid, and then slowly adding the polymer in particulate form at room temperature while the mixture is exposed to high shear agitation. Commonly the addition of the polymer and its dissolution may be completed within about 4 to 16 hours. Suitable viscosity ranges for the spinning solution at 25° C. commonly range from about 400 to 660 poises. Should the spinning solution be exposed to an elevated temperature for an extended period of time prior to spinning, a reduced viscosity tends to result. Rather than having the inorganic compound completely dissolved in the spinning solution, it is possible that at least a portion of the inorganic compound be dispersed within the spinning solution while in finely divided form.

The polymer which is dissolved in the spinning solution is organic in nature, and is preferably an acid-soluble long-chain relatively high molecular weight synthetic polymeric amide having recurring amide groups as an integral part of the main polymer chain. Such polyamide resinous materials which are commonly designated by the term "nylon," may be formed according to conventional techniques well known in the polymerization art, and commonly possess an average molecular weight of about 12,000 to 20.000. For instance, the acid-soluble resinous materials may be formed by the reaction of a primary or secondary diamine and either a dicarboxylic acid or an amide-forming derivative of such an acid. Illustrative examples of readily available starting materials include nylon 6T which is formed by the condensation of hexamethylenediamine and terephthalic acid, nylon 66 which is formed by the cendensation of hexamethylenediamine with adipic acid, nylon 6 which is obtained by the polycondensation of caprolactam, and nylon 610 which is formed by the condensation of hexamethylenediamine with sebacic acid. The particularly preferred polymers are nylon 6T and nylon 66. It is to be understood that high molecular weight fiber forming polyamides generally may be utilized, and that the process is not limited to the specific nylon types listed. Also, other fiber forming polymers which are capable of being extruded into fibers may be employed. Any organic polymer which is acid-soluble and capable of withstanding the preoxidation step described in detail hereafter is suitable for use in the present invention. Illustrative examples of polymers other than polyamides which may alternatively serve a carrier role in the precursor fiber include cellulosics, polyacrylonitrile, and polybenzimidole resins.

The inorganic compound dissolved in the spinning solution is capable upon subjection to the thermal treatment described in detail hereafter to undergo a sintering reaction in which an inorganic fibrous material is formed having a configuration essentially identical to that of the precursor fiber prior to thermal treatment. The inorganic fibrous material formed according to the present invention is either a metallic oxide or a metallic carbide and is derived directly from the inorganic compound. Suitable acid-soluble inorganic compounds include titanium dioxide, boric oxide (boric anhydride), and aluminum oxide. Titanium dioxide is the particularly preferred inorganic compound. Illustrative examples of inorganic fibrous materials which may be formed utilizing the present invention include essentially pure titanium carbide, titanium dioxide, boron carbide, aluminum oxide, and aluminum carbide.

Prior to the extrusion step of the process it is recommended that the spinning solution be vacuum deaerated so that the presence of voids or bubbles therein is minimized. Satisfactory deaeration may be accomplished by maintaining the spinning solution while at a moderately elevated temperature, e.g. 50° C., under reduced pressure, e.g. 1 mm. Hg, for a few hours, e.g. 5 to 20 hours.

The precursor fiber may be formed by conventional wet or dry spinning techniques. Wet spinning is the preferred technique. For example, the spinning solution may be extruded ito a spin bath where coagulation of the solution and the formation of a fiber takes place. A variety of suitable solvent-nonsolvent systems will be readily apparent to those skilled in the fiber art for use as the coagulating medium or spin bath. Suitable spin baths are nonsolvents for the organic polymer and do not chemically react with the spinning solution. The particularly preferred spin bath is formed from an aqueous solution containing about 20 to 50 percent by weight sulfuric acid, and about 5 percent by weight phosphoric acid. It is recommended that the spin bath be maintained at a temperature of about 30° to 50° C. during the extrusion step of the process.

The precursor fiber is preferably next stretched or drawn to about 100 to 300 percent of its original length by conventional techniques in order to improve its stretch and other physical properties. Wet drawing is particularly preferred. Following the stretching step of the process the precursor fiber may be washed to remove any adhering traces of the spin bath, and dried.

If desired, the precursor fiber may be converted to any one of a variety of fibrous configurations prior to undergoing thermal treatment. For instance, the precursor fiber may be in the form of filaments, staple fibers, tows, plied yarns, knits, braids, fabrics, or other fibrous assemblages while undergoing thermal treatment. Alternatively, various fibrous configurations may be formed from the inorganic fibers of the invention at the conclusion of the sintering portion of the process.

During the initial thermal treatment step of the process the precursor fiber undergoes a preoxidation treatment in an oxygen containing atmosphere, and the polymer carrier is partially carbonized to a stabilized form so that the subsequent sintering step of the process may be endured without the concomitant destruction of the fibrous configuration. The preoxidation step may be conducted by heating the precursor fiber in an oxygen containing atmosphere, such as ordinary air, at a temperature ranging from about 250° to about 400° C. without melting the same. The exact preoxidation temperature selected is dependent upon the resistance to distortion at elevated temperatures of the polymer and should not exceed the polymer melting point during at least the initial portion of the preoxidation treatment. While heating is conducted a charred product results which is capable of withstanding burning when subjected to an ordinary match flame.

Volatile components commonly expelled during the preoxidation step of the process include water vapor, oxygen, and carbon monoxide and carbon dioxide resulting from a partial combustion of the polymer. Typically a 15 to 50 percent reduction in the weight of the precursor fiber takes place during the preoxidation step of the process. It is believed that a cross-linking of carbon atoms occurs during the preoxidation step of the process to produce a charred product which is capable of effectively serving as a carrier for the inorganic compound.

The time required to complete the initial step of the instant process varies with the preoxidation temperature employed. For instance, if a temperature as low as about 250° C. is utilized, then heat treatment in an oxygen containing atmosphere of up to about 3 hours may be desirable. Preoxidation temperatures much below 250° C. are not recommended because of the difficulty in obtaining satisfactory stabilization within a reasonable period of time. At a temperature of about 400° C. preoxidation may be satisfactorily conducted within about 20 minutes. Preoxidation temperatures much above 400° C. are not recommended because the rate of oxidation becomes faster than the rate of cross-linking leading to excessible losses of material. In a particularly preferred embodiment of the invention utilizing 6T nylon formed by the condensation of hexamethylene diamine and terephthalic acid, as the carrier for the precursor fiber, the preoxidation portion of the process is conducted at about 315° C. for a period of about 60 minutes. Satisfactory preoxidation may commonly be completed within about 10 minutes to 3 hours. The precursor fiber may be satisfactorily contained in any suitable receptacle, which will withstand the temperatures employed during the preoxidation step of the process. For instance, the precursor fiber may be placed in a stainless steel boat or tray, and exposed to the preoxidation treatment in a conventional tube furnace in which the required elevated temperature is produced by radiation from electrically heated walls. Also, the preoxidation reaction may be carried out in an autoclave by heating to the required tempearture/time schedule. A continuous preoxidation treatment may be accomplished by the continuous passage of a precursor fiber through a heated chamber or calcining furnace. The fibrous structure of the precursor fiber is retained throughout the preoxidation step of the process. There is, however, a tendency for the precursor fiber to shrink while undergoing preoxidation.

In the final thermal treatment step of the instant process the charred product is heated at a highly elevated temperature of about 1200 to 2800° C. in a suitable atmosphere to accomplish the formation of the desired inorganic fibrous material. When the treatment is conducted in a reducing atmosphere, a fibrous carbide is formed. When the treatment is conducted in an oxygen containing atmosphere, a fibrous oxide is formed. The preoxidized organic polymer serves to hold the system in the original fibrous configuration until the inorganic fibrous material is formed. Weight losses of approximately 40 to 75 percent based on the weight of the original precursor fiber are commonly encountered during the present sintering step. While undergoing such heating the charred product assumes a white-hot state which ultimately yields the desired product. The fibrous configuration of the original precursor fiber is maintained. Suitable reducing atmospheres in which the sintering step may be conducted include nitrogen and argon.

In a preferred embodiment of the invention formation of the desired inorganic carbide fibrous material is attained by heating the charred fibrous product in an induction furnace while in the presence of a reducing atmosphere. Suitable sintering temperatures may likewise be produced by use of an oxyacetylene torch, arc furnace, solar furnace, low temperature plasma flame, etc. Satisfactory sintering may generally be achieved within about 10 seconds to about 10 minutes. In a particularly preferred embodiment of the invention the charred product is maintained at a temperature of about 2500° C. for at least about 5 minutes. If heating periods much below 10 seconds are utilized, then substantially complete conversion to the desired inorganic fibrous material is commonly not achieved. Temperatures much in excess of about 2800° C. are not recommended primarily because of the well-known material handling difficulties encountered at such extreme temperatures, coupled with the possibility of subliming the inorganic fiber. Suitable containers or supports for the charred product during the sintering step of the process include graphite trays, or graphite tubes.

By controlling the nature of the atmosphere in which the sintering step is conducted one may produce either an inorganic fibrous oxide or an inorganic fibrous carbide. Once an inorganic fibrous carbide, such as titanium carbide, is formed it may be converted to the corresponding oxide by introducing oxygen into the atmosphere and maintaining the sintering temperature. However, it is recommended for simplicity that when one wishes to form an inorganic fibrous oxide, the entire sintering treatment be conducted in an oxygen containing atmosphere.

When incorporated in a binder or matrix, the inorganic fibrous material of the present invention serves as a highly effective reinforcing medium. The binder selected for use with the inorganic fibrous material is preferably also resistant to elevated temperatures and is of limited flammability. Organic or inorganic binders may be utilized to bond the inorganic fibrous material and to form a solid composite article. Illustrative examples of suitable binders include plaster of Paris, concrete, etc.; silicone resins, epoxy resins, polybenzimidazole resins, etc.; metals such as aluminum, silver, steel, tungsten, etc.; ceramics from e.g. silica, alumina, zirconia, etc. If desired, conventional pigments, coloring agents, etc. may be present in the binder together with the inorganic fibrous material to achieve the desired decorative or appearance qualities. In a preferred embodiment of the invention, the binder may comprise about 25 to 99 percent by weight of the composite article. The composite articles find particular utility as high strength insulating and structural materials which are capable of withstanding elevated temperatures.

The inorganic fibrous materials formed according to the present invention also find utility in the formation of high temperature screens and filters.

The following examples are given as specific illustrations of the invention. It should be understood, however, that the invention is not limited to the specific details set forth in the examples.

Example I

A spinning solution is prepared utilizing concentrated sulfuric acid as solvent and containing 5 percent by weight titanium dioxide and 10 percent by weight 6T nylon formed by the condensation of hexamethylenediamine and terephthalic acid. Titanium dioxide is first dissolved in the sulfuric acid, the nylon is slowly added at room temperature, and agitated with a high shear mixer for 10 hours in order to produce a homogenous solution. The nylon prior to its dissolution is in the form of small granules, and possesses a melting point of about 360° C. The resulting spinning solution is vacuum deaerated at 1 mm. of Hg while maintained at 50° C. for 16 hours, and exhibits a viscosity of 2000 poises.

The spinning solution is extruded while maintained at a temperature of 30° C. by use of nitrogen pressure to force the solution through a one inch x 40 hole x 100 micron jet. The spinning bath comprises 30 percent by weight sulfuric acid, 5 percent by weight phosphoric acid, and 65 percent by weight water, and is maintained at 40° C. The precursor fiber is wet drawn 250 percent, and collected on a perforated bobbin. Washing is accomplished by submerging the bobbin for 1 hour in a static water bath containing one percent phosphoric acid by weight. The precursor fiber is further washed by agitating the bobbin in an identical dilute phosphoric acid aqueous wash solution, and dried by standing at room temperature.

The precursor fiber containing titanium dioxide is next preoxidized and converted to a charred product having a configuration essentially identical to that of the starting material while maintained at 315° C. in an Aminco oven for 60 minutes. The preoxidation treatment is conducted in an atmosphere of air. When exposed to the flame of an ordinary match, the charred product does not melt nor is it consumed.

The charred product is next continuously run through an induction furnace maintained at 2500° C. while under an atmosphere of argon. The residence time for the charred product within the furnace is 5 minutes. An essentially pure titanium carbide fiber results having a tenacity of 42,000 p.s.i., and a modulus of $4 \times 10^6$ p.s.i. Minute traces of graphite may be detected within the titanium carbide fiber.

Example II

The process of Example I is repeated with the exception that the pyrolysis step is conducted in an air atmosphere. An essentially pure titanium dioxide fiber results.

Example III

The process of Example I is repeated with the exception that boric oxide is substituted for the titanium dioxide component. An essentially pure boron carbide fiber results.

Example IV

The process of Example I is repeated with the exception that aluminum oxide is substituted for the titanium dioxide component. An essentially pure aluminum carbide fiber results.

Example V

The process of Example I is repeated with the exception that aluminum oxide is substituted for the titanium dioxide component, and the pyrolysis step is conducted in an air atmosphere. An essentially pure aluminum oxide fiber results.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A process for the production of titanium carbide fibrous materials comprising forming an acidic spinning solution containing about 3 to 7.5 percent by weight titanium dioxide and about 9 to about 12.5 percent by weight of an acid-soluble polyamide resinous material formed by the condensation of hexamethylenediamine and terephthalic acid dissolved therein, wet spinning said solution to form a precursor fiber in which said polyamide resinous material serves as a carrier for said titanium dioxide, wet drawing said precursor fiber about 100 to 300 percent, preoxidizing said precursor fiber at a temperature of about 250° to 400° C. for a period of about 10 minutes to 3 hours to produce a charred product which retains a fibrous configuration and is capable of withstanding burning when subjected to an ordinary match flame, and subsequently sintering said charred product at a temperature of about 1200° to 2800° C. in a reducing atmosphere for about 10 seconds to about 10 minutes to produce a fibrous titanium carbide material.

2. A process according to claim 1 which said preoxidation step is conducted at a temperature of about 315° C. for about 60 minutes, and said sintering step is conducted at a temperature of about 2500° C. for at least about 5 minutes.

3. A process for the production of titanium dioxide fibrous materials comprising forming an acidic spinning solution containing about 3 to 7.5 percent by weight titanium dioxide and about 9 to about 12.5 percent by weight of an acid-soluble polyamide resinous material formed by the condensation of hexamethylenediamine and terephthalic acid dissolved therein, wet spinning said solution to form a precursor fiber in which said polyamide resinous material serves as a carrier for said titanium dioxide, wet drawing said precursor fiber about 100 to 300 percent, preoxidizing said precursor fiber at a temperature of about 250° to 400° C. for a period of about 10 minutes to 3 hours to produce a charred product which retains a fibrous configuration and is capable of withstanding burning when subjected to an ordinary match flame, and subsequently sintering said charred product at a temperature of about 1200° to 2800° C. in an oxygen-containing atmosphere for about 10 seconds to about 10 minutes to produce a fibrous titanium dioxide material.

4. A process according to claim 3 in which said preoxidation step is conducted at a temperature of about 315° C. for about 60 minutes, and said sintering step is conducted at a temperature of about 2500° C. for at least about 5 minutes.

References Cited
UNITED STATES PATENTS

| | | | |
|---|---|---|---|
| 2,908,545 | 10/1959 | Teja | 264—205 |
| 3,004,832 | 10/1961 | Aagaard | 23—202 |
| 3,154,613 | 10/1964 | Epstein et al. | 264—184 |
| 3,180,741 | 4/1965 | Wainer et al. | 23—202 |
| 3,251,796 | 5/1966 | Saar et al. | 264—184 |
| 3,311,481 | 3/1967 | Sterry et al. | 106—57 |
| 3,311,689 | 3/1967 | Kelsey | 264—210 |
| 3,148,232 | 9/1964 | Scheyer | 264—108 |
| 3,385,915 | 5/1968 | Hamling | 106—62 |

OTHER REFERENCES

R. T. Morrison & R. N. Boyd: Organic Chemistry, 2nd ed., 1966, p. 911.

JULIUS FROME, Primary Examiner

JOHN H. MILLER, Assistant Examiner

U.S. Cl. X.R.

23—202; 106—43, 55; 264—65, 66, 182, 184, 210